United States Patent
Hirsch

[15] 3,655,508
[45] Apr. 11, 1972

[54] ELECTROSTATIC FIELD APPARATUS FOR REDUCING LEAKAGE OF PLASMA FROM MAGNETIC TYPE FUSION REACTORS

[72] Inventor: Robert L. Hirsch, Potomac, Md.

[73] Assignee: International Telephone and Telegraph Corporation, Nutley, N.J.

[22] Filed: June 12, 1968

[21] Appl. No.: 736,355

[52] U.S. Cl. .................................. 176/5, 176/7, 315/111
[51] Int. Cl. .................................................. G21b 1/00
[58] Field of Search ....................... 176/3, 6, 5, 7; 315/111

[56] References Cited

FOREIGN PATENTS OR APPLICATIONS 1,226,493  2/1960  France ............................. 176/3
1,459,469  10/1966  France ............................. 176/3

OTHER PUBLICATIONS

June 1963 Nucleonics pages 108

Primary Examiner—Reuben Epstein
Attorney—Percy P. Lantzy, C. Cornell Remsen, Jr., Walter J. Baum, Philip M. Bolton, Isidore Togut, Charles L. Johnson, Jr. and Hood, Gust, Irish & Lundy

[57] ABSTRACT

This invention relates to a fusion reactor of the magnetic mirror type having a plasma trap defined by relatively widely spaced field lines, and end regions closed substantially by said field lines. Plasma leakage from the trap occurs primarily through the end regions inasmuch as the plasma particles tend to follow the field lines instead of moving transversely thereto. Electrostatic reflectors serve to reflect particles that have escaped from the plasma trap via the end regions back thereinto along the escape paths, these electrostatic reflectors taking the form of positively and negatively charged field-forming electrodes arranged in tandem such that positively charged plasma particles will be reflected by one electrode and negatively charged particles will be reflected by the other.

6 Claims, 4 Drawing Figures

Inventor
ROBERT L. HIRSCH
by Hood, Gust, Irish & Lundy
Attorneys

TO VACUUM PUMP

Inventor
ROBERT L. HIRSCH
by Hood, Gust, Irish & Lundy
Attorneys

ELECTROSTATIC FIELD APPARATUS FOR REDUCING LEAKAGE OF PLASMA FROM MAGNETIC TYPE FUSION REACTORS

BACKGROUND OF THE INVENTION

This invention relates generally to controlled fusion reactors and more particularly to a reactor commonly referred to as a magnetic mirror machine in which a magnetic field defines a central volume of substantially uniform intensity and substantially closed end regions of increased field intensity through which plasma leakage can and does occur. This invention is directed to the concept of minimizing energy and particle losses due to this particular leakage by intercepting and returning to the plasma region high energy particles which have leaked through the end regions.

DESCRIPTION OF THE PRIOR ART

In order to obtain a thermonuclear fusion reaction which produces more energy than it consumes, it is generally agreed that the fuel must be raised to an ignition point, or in other words the nuclei of the fuel must contain sufficient energy so they will fuse. One of the basic problems is that this ignition point is equivalent to hundreds of millions of degrees centigrade. Specifically considering deuterium as a fuel, it can be theoretically proven that if one starts with a mass of deuterium gas at standard temperature and pressure, a temperature of 100,000,000° C. in the mass will result in some of the deuterium atoms fusing and thereby releasing energy. The pressure of the mass at this temperature will be in the vicinity of 22,000,000 p.s.i. However, at this temperature and pressure, the reaction is not self-sustaining, the reaction becoming self-sustaining at about 350,000,000° C.

Consideration of the foregoing reveals two facts. One is that if the energy necessary to sustain a fusion reaction is to be introduced into a plasma by means of the random motion of the plasma nuclei, or in other words by raising the temperature of the plasma, the pressure of the plasma at standard temperature must be on the order of 1/10,000ths of an atmosphere in order that at 350,000,000° C. the pressure of the gas will be within controllable bounds. It is clear, however, that working with gases at such low pressures involves the solving of numerous difficult problems. Secondly, it is clear that the walls of any container used to contain the plasma cannot be maintained at or near the temperature of the plasma since no material known to man would remain in a solid or liquid state at that temperature. On the other hand, if the walls of the container are not maintained at or near the temperature of the plasma, it is clear that the particle energy of the nuclei of the plasma will be dissipated, thus quenching the reaction, whenever quantities of plasma particles strike the container walls, so that a continuous fusion reaction could not be maintained.

One attempt at solving the problem of confining a very hot gas within a material chamber without allowing any appreciable amount of the gas to reach the chamber walls has been to confine the plasma within a magnetic field which will keep the plasma particles away from the container walls. One apparatus for producing such a magnetic field is commonly referred to as the Pyrotron or magnetic mirror machine wherein a modified, solenoidal magnetic field is used to create a trap which defines a central plasma-trapping region of substantially uniform intensity and end regions of increased field intensity, the field lines being separated in the plasma-trapping region so as to define a relatively large volume and in the end regions being squeezed together so as to provide end closures (mirrors) for the plasma-trapping region. In such arrangements, plasma temperature has been limited, because of excessive heat loss through thermal conduction at the ends along magnetic field lines to cold plasma and container walls external to the plasma-trapping region. Even though the magnetic mirrors on the ends reflect many particles, a significant fraction of the plasma has been found to escape from the central region along the field lines which continue past the mirror regions.

SUMMARY OF THE INVENTION

In accordance with the broader aspects of this invention, field-forming electrodes are disposed adjacent to the end regions aforementioned for the purpose of establishing positive and negative equipotential surfaces so arranged as to intercept and reflect escaping particles back into the plasma region from which they escaped. A reactor constructed in accordance with the foregoing includes an elongated cylindrical vessel for providing an evacuated space with solenoid means being disposed about the vessel to provide the magnetic field or trap just described. The equipotential surfaces are formed by two different sets of electrodes, these sets being disposed symmetrically opposite the end regions of the magnetic trap. Two electrodes, respectively, juxtaposed with respect to the end regions are provided with apertures through which plasma particles may flow. These electrodes have a positive potential applied thereto such that positively charged particles escaping from the end regions will be reflected backwardly into the plasma region. Outside and spaced from the aforesaid two electrodes are two additional electrodes in axial registry therewith, these latter two electrodes being charged negatively so as to reflect negatively charged particles (electrons) back into the plasma region.

There is thus provided a method of minimizing energy and particle losses produced by the escape of plasma particles from the end regions of a magnetic trap, this method including the steps of creating two spaced equipotential surfaces transverse to the paths of particle escape from the aforesaid end regions, utilizing such surfaces to reflect particles of one charge back into said trap along paths substantially coincident with the escape paths and at energies substantially equal to the escape energies. These equipotential surfaces are pervious to particles of the opposite charge. Next, two other equipotential surfaces are created outwardly from the first-mentioned surfaces, respectively, transverse to the paths of particle escape from said end regions, these latter equipotential surfaces being utilized to reflect particles of the opposite charge back into the trap along paths substantially coincident with the escape thereof at energies substantially equal to the escape energies, whereby particles returned to the trap will possess essentially the same energies as they had when they escaped therefrom.

It is therefore an object of this invention to provide apparatus wherein a magnetic field is employed to confine a plasma with field-forming electrodes which serve to reflect escaping plasma particles back into the plasma region, thereby effectively reducing energy and particle losses due to the escape of such particles.

It is another object of this invention to provide controlled fusion reactors and methods whereby energy and particle losses due to the escape of plasma particles are minimized by the establishment of equipotential surfaces in the paths of the escaping particles such that the particles are reflected backwardly along the primary escape paths into the plasma region from which they escaped, the equipotential surfaces being disposed transversely to the magnetic field lines which emanate from the mirror regions.

It is still another object of this invention to provide a controlled fusion reactor and method for electrostatically separating the two constituents of a leaking plasma and then returning them to the plasma chamber without appreciable loss of energy.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
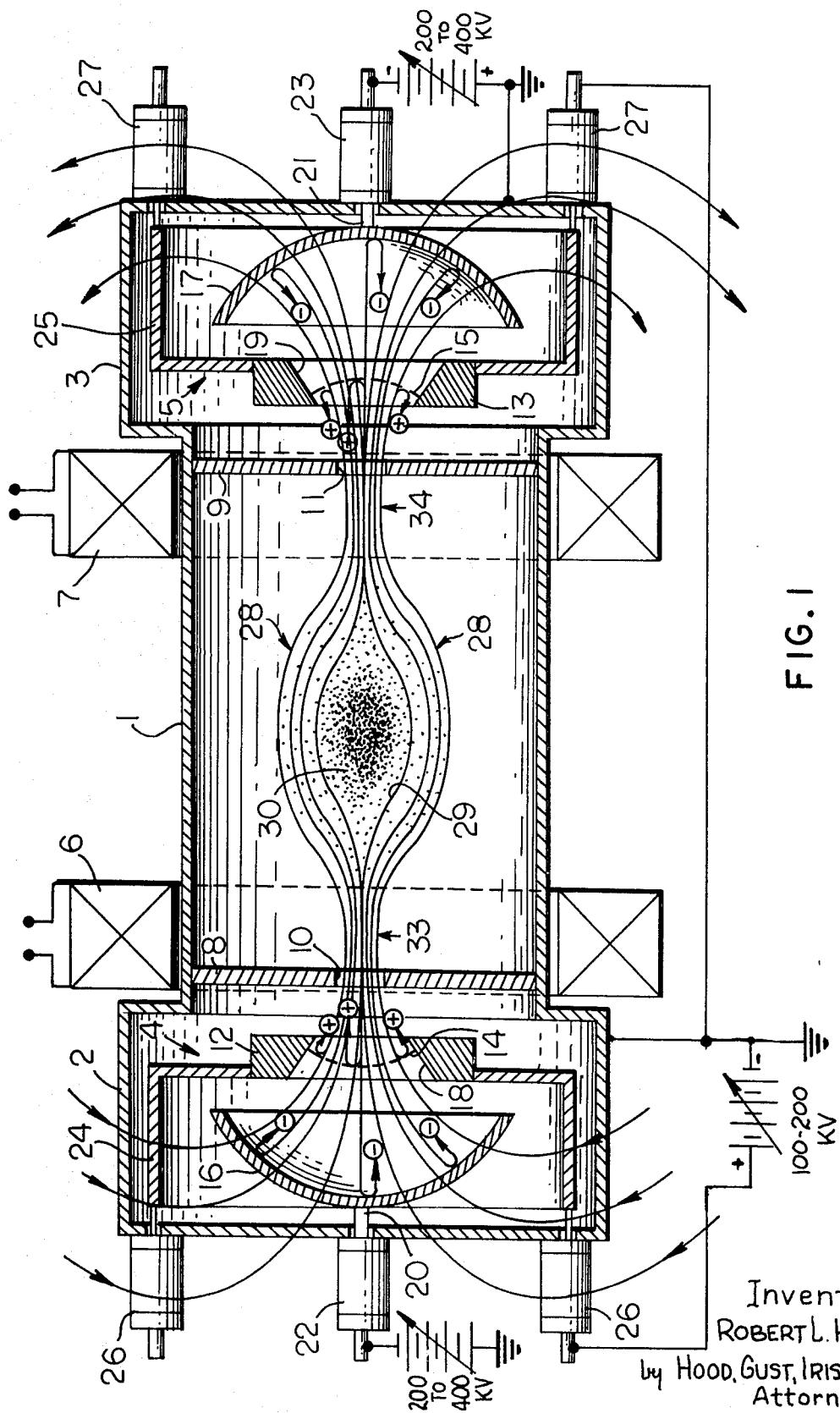
FIG. 1 is a longitudinal sectional view of one embodiment of this invention.
Figure 2:
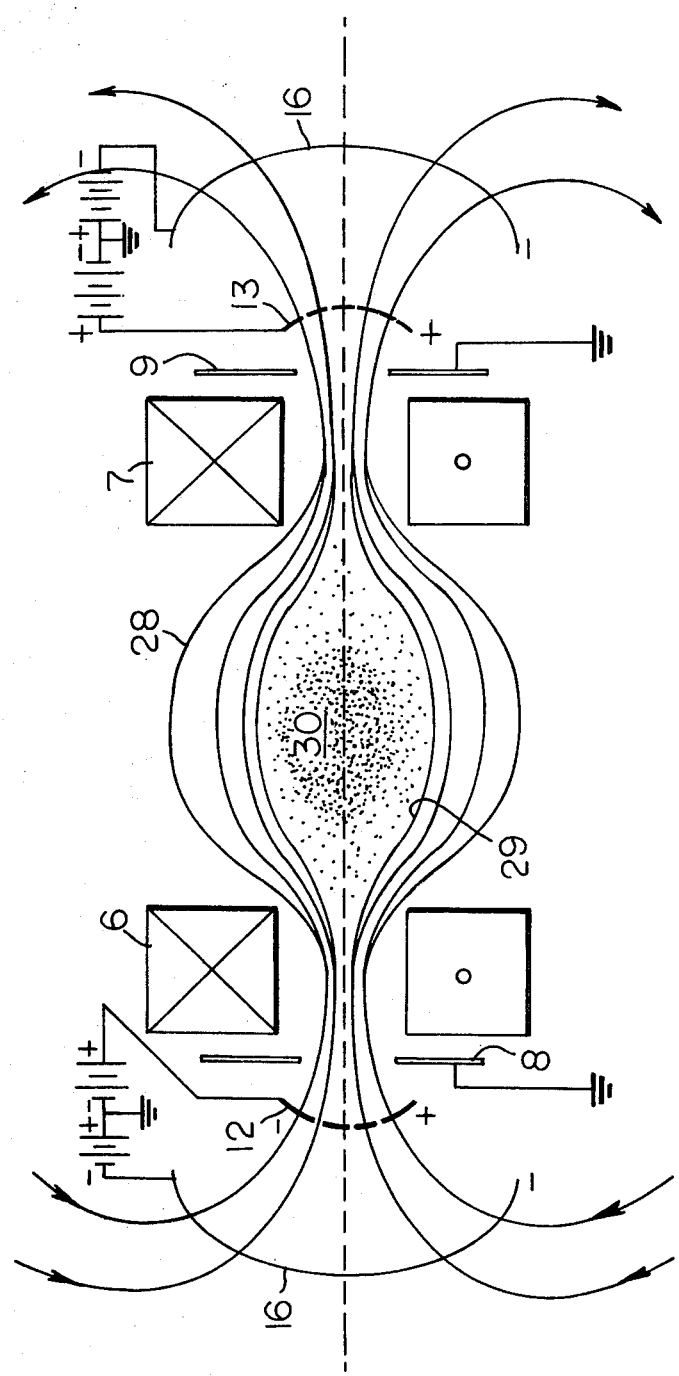
FIG. 2 is a simplified schematic illustration of the same embodiment used for explaining the theory of operation.
Figure 3:
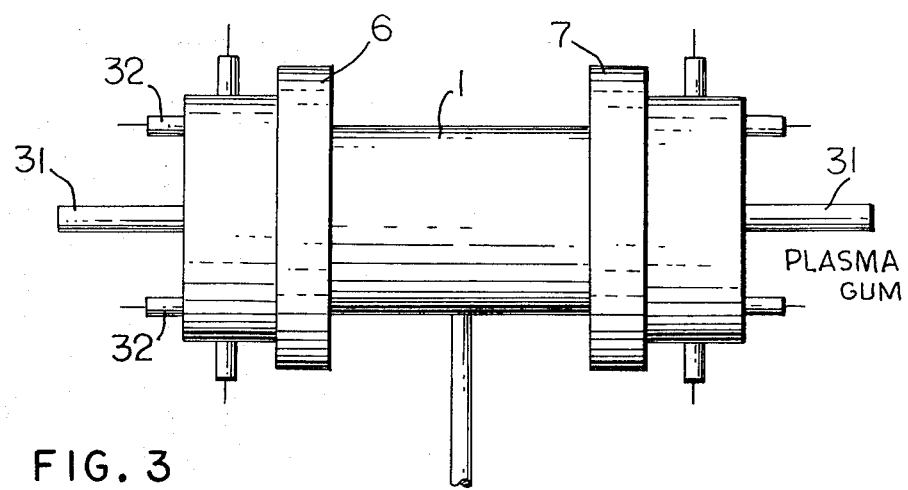
FIG. 3 is a side elevation of the same embodiment provided with plasma guns for injecting plasma through the opposite ends of the apparatus.

Referring to the drawings, and more particularly to FIGS. 1, 2 and 3, the thermonuclear reactor of this invention is constructed with an elongated cylindrical vessel of stainless steel having enlarged end portions 2 and 3 which contain, respectively, a set of field-forming electrodes, indicated generally by the numerals 4 and 5. The central portion 1 of the vessel is surrounded by the usual magnetic field-producing device, in this instance a pair of coils 6 and 7 axially spaced apart as shown. In the opposite ends of the central portion of the vessel 1 are mounted, respectively, a pair of discs 8 and 9 having apertures 10 and 11 coaxially disposed therein. These discs 8 and 9 are preferably of the same metal as vessel 1, stainless steel being an example, and are conductively attached thereto and in turn connected to the ground potential terminal of the power supply, as shown, to act as ground potential electrodes.

The field-forming electrodes 4 and 5 each include a coaxially positioned annular element 12, 13 having a grid 14, 15 of relatively large mesh screen disposed centrally thereof and convexly shaped as shown. Coaxially positioned with respect to the elements 12, 13 and axially spaced outwardly therefrom are two cup-shaped electrodes 16 and 17 somewhat larger in diameter than the apertures 18 and 19 in the annular elements 12 and 13, respectively. The cup-shaped elements 16 and 17 are rigidly supported by means of respective conductive mounting bars 20 and 21 which form the central conductors of conventional stand-off insulators 22 and 23 securely attached to the ends of the vessel 1 as shown.

The annular elements 12 and 13 are respectively secured in position by means of rigid sleeves 24 and 25 of stainless steel or the like, these sleeves being securely supported in position by the conducting bars of conventional stand-off insulators 26 and 27, respectively. The two electrodes 12 and 13 are electrically insulated from the electrodes 16 and 17, all of these also being insulated from the vessel 1.

In operation, a suitable energizing potential is applied to the two coils 6 and 7 such that the two produce a reinforcing magnetic field of essentially the same configuration as would be produced by a solenoid. With the two coils 6 and 7 spaced axially apart as shown, the magnetic field produced thereby will assume the shape as indicated by the field lines 28, these defining the boundaries of a plasma trap. This particular arrangement of the coils 6 and 7 and the shape of the magnetic field formed thereby are conventional and therefore need no further explanation here. The volume 29 within the field is the magnetic trap or plasma-trapping region and contains a high energy plasma, indicated by numeral 30, of negatively and positively charged particles, such as electrons and ions of deuterium and tritium. The plasma is electrically neutral and at a relatively high pressure.

Figure 4:
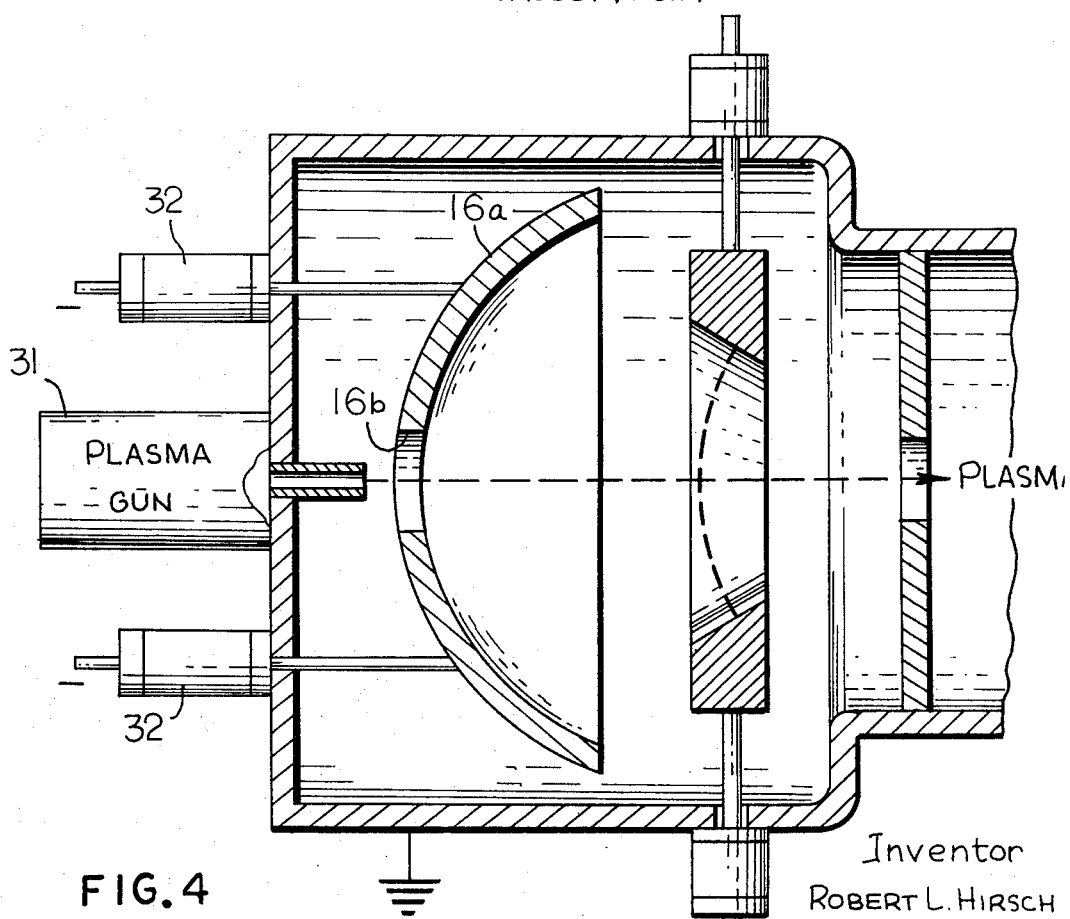
FIG. 4 is a fragmentary sectional view of one end portion of the arrangement of FIG. 3.

The vessel 1 is initially evacuated and charged with deuterium and tritium gas as necessary in order to form the plasma 30. The plasma 30 may be formed by any one of several well known means, one being illustrated in FIGS. 3 and 4 wherein plasma guns 31 are fitted to the ends of the vessel 1 for the purpose of injecting plasma particles into the region of the vessel between the coils 6 and 7. In the event the plasma guns 31 are used, the cup-shaped electrodes 16a of FIG. 4 are each provided with a central aperture 16b for receiving the stream of plasma particles from the respective gun 31. The electrode 16a itself is supported by means of the central conductors of two heavy-duty insulators 32 as shown.

In the boundary or end regions 33 and 34 of the magnetic trap 29, the field lines are compressed tightly together as shown, thereby forming end closures for the trap 29. The apertures 10 and 11 are positioned in coincidence with these end regions 33 and 34 and are of a size as will become apparent from the description that follows. Axially beyond the coils 6 and 7, the field lines spread as shown so as to complete the magnetic loop, the apertures 18 and 19 in the electrode elements 12 and 13 being of such shape and size as to receive those field lines which are compressed closer together in forming the end regions 33 and 34. By the same token, the cup-shaped electrodes 16 and 17 are of such size and shape as to intercept the same field lines, the inner surfaces of the two electrodes 16 and 17 being positioned essentially normal to these lines.

The grids 14 and 15 inside the apertures 18 and 19 are curved to an extent that they are substantially normal to the field lines passing therethrough.

Potentials are applied to the various electrodes as shown, the vessel 1 being grounded. Relatively high positive and negative potentials are applied to the electrodes 12, 13 and 16, 17, as shown.

Within the apertures 18, 19 of the two electrodes 12, 13, equipotential surfaces are formed substantially coincident with the grids 14 and 15. By the same token, equipotential surfaces are formed immediately adjacent to the inner surfaces of the electrodes 16 and 17 which are of the same shape.

If it is assumed that the plasma 30 contains high energy ions and electrons of 100-kev, for example, these particles are for the most part trapped within the volume 29 by the action of the magnetic mirrors. However, these mirrors are not fully effective and some plasma will escape through the end regions 33 and 34. Both the positively and negatively charged particles will tend to follow the field lines after they have emerged from the end regions 33 and 34. The positively charged particles will thereupon encounter the equipotential surfaces, which are positive, determined by the grids 14 and 15. The voltage applied to the electrodes 12 and 13 is adjusted to such a value that these positive particles will be retarded, stopped, and then returned along reflex paths backwardly into the chamber 29, these return paths substantially coinciding with the escape paths. The electrons, on the other hand, pass through the grids 14 and 15 where they counter the retarding fields of the negative potential electrodes 16 and 17. The potentials applied to these electrodes are sufficiently high so as to reflect them backwardly along the escape paths through the respective electrodes 12 and 13 and into the plasma trap 29. Thus, both the positively and negatively charged particles escaping from the end regions 33 and 34 will be returned to the plasma trap 29 with essentially the same energy as that of the time of escape. Thus, the energy of the escaping particles is not lost but is preserved and returned to the plasma 30 within the trap 29.

This electrostatic reflection process proceeds in two steps. First, the two species must be separated and then each reflected in a region characteristic of its own charge. The flux of plasma from the volume 29 is composed of equal currents of ions and electrons. It is desirable to reflect the ions first since their space-charge will be greater than that of the electrons. By so doing, the electrons which are present will partly compensate the excessive ion space charge created by the separation and reflection process.

One of the principal problems involved in controlling fusion reactions is the stabilization and confinement of the plasma. With respect to confinement, problems have been encountered through loss of high energy particles along magnetic field lines. By means of the present invention, the end regions of the plasma trap are effectively plugged by means of discretely disposed electric fields which serve to reflect escaping particles along essentially the same paths of their escape. Instead of the energy of the escaping particles being lost, it is returned and restored to the plasma, thereby preserving the plasma density as well as the energy thereof.

While an elliptically shaped trap 29 has been shown, it will appear obvious that other trap shapes and designs are possible and that the electrostatic mirror concept of this invention can be employed to return the plasma particles back into the trap.

While there have been described above the principles of this invention in connection with specific apparatus, it is to be clearly understood that this description is made only by way of example and not as a limitation to the scope of the invention.

What is claimed is:

1. A controlled thermonuclear reactor comprising means providing a magnetic trap having a central plasma-trapping region defined by relatively widely separated flux lines and boundary regions closed substantially by said flux lines, first means for reflecting particles of one charge back into said plasma-trapping region which have been leaked therefrom through said boundary regions, said first means including two field-forming electrodes having apertures coaxial with respect to the axis of said flux lines, said two electrodes being positioned opposite said boundary regions respectively and being pervious to particles of the opposite charge, second means adjacent to said first means for reflecting particles of said opposite charge back into said plasma-trapping region which have leaked therefrom through said boundary region and said first means, said second means including two additional field-forming electrodes coaxial with respect to said axis and positioned symmetrically opposite said apertures respectively on the sides thereof opposite said plasma-trapping region and means applying opposite potentials to said first and second means with respect to a reference potential.

2. The reactor of claim 1 in which said first and second means are electrostatic and, respectively, establish electrostatic surfaces in space which are transverse to and intercepted by the flux lines of said magnetic field.

3. The reactor of claim 2 in which the second means is impervious to particles of said one charge, said second means including a surface at a potential opposite in polarity to said one charge thereby serving as a collector thereof.

4. The reactor of claim 3 in which said magnetic trap is axially symmetric, and including two ground-potential electrodes disposed at said boundary regions, respectively, between said first-mentioned electrodes and said plasma-trapping regions, said ground-potential electrodes being pervious to the flow of particles of both charges therethrough.

5. The reactor of claim 4 in which said ground-potential electrodes each have an aperture coaxial with respect to said axis, and means for applying a positive potential to said first-mentioned electrodes and a negative potential to said additional electrodes.

6. The reactor of claim 5 including an elongated cylindrical vessel for providing an evacuated space, solenoid means disposed about said vessel to provide said magnetic trap thereinside, said ground-potential electrodes each including a relatively flat conductor having an opening in the center which is coaxial with respect to said axis, said ground-potential electrodes being positioned in the opposite end portions of said vessel, respectively, at right angles to said axis, said first-mentioned electrodes being in the opposite ends of said vessel and spaced outwardly from the respective ground-potential electrodes, said additional electrodes also being in the opposite ends of said vessel spaced outwardly from the respective first-mentioned electrodes, said first-mentioned and said additional electrodes being insulated from each other, and means for applying potentials to said electrodes.

* * * * *